United States Patent [19]

Schlenker et al.

[11] Patent Number: 5,199,956
[45] Date of Patent: Apr. 6, 1993

[54] PROCESS FOR DYEING HYDROPHOBIC TEXTILE MATERIAL WITH DISPERSE DYES FROM SUPER-CRITICAL CARBON DIOXIDE

[75] Inventors: Wolfgang Schlenker; Dieter Werthemann, both of Basel; Peter Liechti, Arisdorf; Angelo D. Casa, Riehen, all of Switzerland

[73] Assignee: Ciba-Geigy Corporation, Ardsley, N.Y.

[21] Appl. No.: 751,047

[22] Filed: Aug. 28, 1991

[30] Foreign Application Priority Data

Sep. 3, 1990 [CH] Switzerland .......... 2836/90
Sep. 3, 1990 [CH] Switzerland .......... 2837/90
Sep. 3, 1990 [CH] Switzerland .......... 2838/90

[51] Int. Cl.$^5$ .......... D06P 1/00; D06P 3/54; D06P 5/20; C09B 1/28
[52] U.S. Cl. .......... 8/473; 8/475; 8/662; 8/675; 8/921; 8/922; 8/924; 8/928; 552/255; 552/258

[58] Field of Search .......... 8/473, 475

[56] References Cited

U.S. PATENT DOCUMENTS 4,393,007 7/1983 Priester et al. .......... 552/258
4,655,970 4/1987 Priester et al. .......... 552/255

FOREIGN PATENT DOCUMENTS 3906724 9/1990 Fed. Rep. of Germany .
1582197 12/1980 United Kingdom .

OTHER PUBLICATIONS

J. A. Hyatt, J. Organic Chemistry, 1984, vol. 49, pp. 5097-5101.
Journal of Organic Chemistry 49:26 (1984).

Primary Examiner—A. Lionel Clingman
Attorney, Agent, or Firm—Marla J. Mathias; Edward McC. Roberts

[57] ABSTRACT

Polyester textile material can be dyed from supercritical $CO_2$ with special disperse dyes.

31 Claims, No Drawings

PROCESS FOR DYEING HYDROPHOBIC TEXTILE MATERIAL WITH DISPERSE DYES FROM SUPER-CRITICAL CARBON DIOXIDE

The present invention relates to a process for dyeing hydrophobic textile material with disperse dyes.

Hydrophobic textile materials are normally dyed from aqueous dye liquors. In such dyeing, a complete bath exhaustion never occurs, i.e. the dyes do not exhaust quantitatively onto the respective substrate, with the further result that, after the dyeing process, the residual dye liquor still contains—depending on the particular dyes and substrates—more or less large amounts of dye. For this reason, dyeing results in the formation of relatively large amounts of coloured effluents which have to be purified at considerable trouble and expense.

It is the object of this invention to provide a process for dyeing textile material in which no, or no appreciable, amounts of coloured effluents are formed. This object is achieved by the process of this invention.

Accordingly, the invention relates to a process for dyeing hydrophobic textile material with disperse dyes, which comprises treating said textile material in super-critical carbon dioxide with an azo dye of formula $$D—N=N—K \qquad (1)$$

wherein
D is the radical of an aromatic diazo component and K is the radical of a coupling component, or with an anthraquinone dye of formula (2)

(3)

or (4)

wherein
$Z_1$ and $Z_2$ are each independently of the other hydrogen or halogen,
$R_{19}$ is hydrogen or unsubstituted or substituted alkyl or phenyl,
$R_{20}$ is hydrogen, chloro, $C_1$-$C_4$alkoxy, unsubstituted or substituted phenoxy, $C_1$-$C_4$alkoxycarbonyl, $C_1$-$C_8$alkyltetrazolyl, phenoxysulfonyl or a radical of formula $$—O—A—O—Y$$

wherein A is an alkylene radical of 2 to 6 carbon atoms and Y is unsubstituted or substituted phenyl, phenoxycarbonyl, phenylcarbonyl, $C_1$-$C_4$alkylcarbonyl or $C_1$-$C_4$alkoxycarbonyl, $R_{21}$ is hydrogen, chloro, unsubstituted or substituted phenoxy or cyano, $R_{22}$ is hydroxy, amino or a —$NHR_{26}$ radical, wherein $R_{26}$ is unsubstituted or substituted alkyl or phenylsulfonyl, X is amino or nitro, $R_{23}$ is hydroxy, amino or unsubstituted or substituted alkylamino, n is 0, 1 or 2, $R_{24}$ is hydroxy, amino or unsubstituted or substituted alkylamino or phenylamino, A is an alkylene radical of 2 to 6 carbon atoms, $R_{25}$ is $C_1$-$C_6$alkyl, $C_1$-$C_6$alkoxy, $C_1$-$C_6$alkoxy-$C_2$-$C_4$alkoxy, phenoxy, phenoxy-$C_2$-$C_4$-alkoxy or $C_1$-$C_6$alkoxycarbonyl-$C_2$-$C_4$alkoxy, or with a dye of formula (5)

(6)

(7)

(8)

(9)

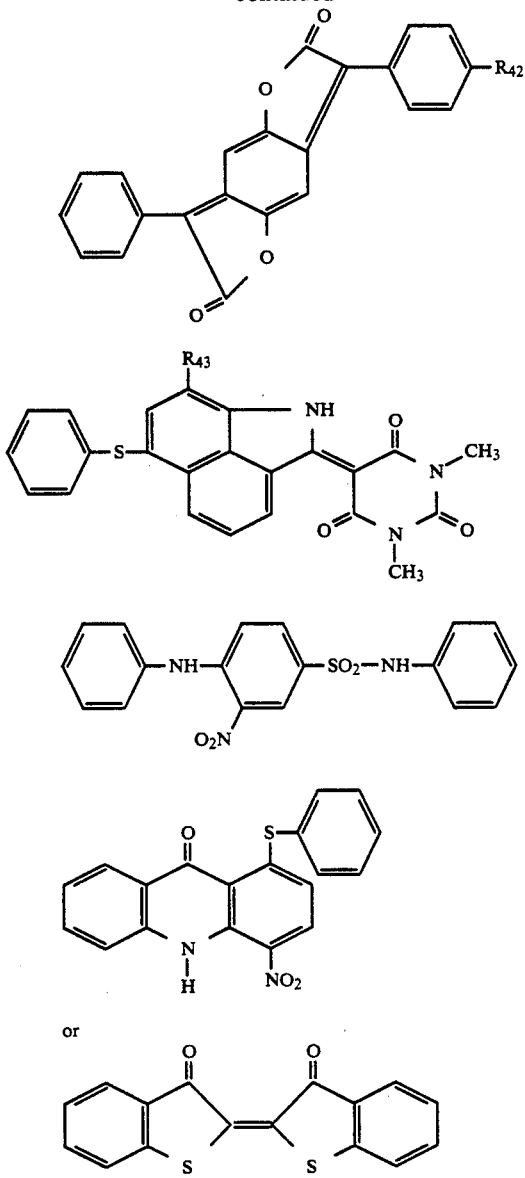

wherein
R$_{29}$ is hydrogen or R$_{29}$ and R$_{33}$, together with the N atom and the two linking carbon atoms, are a 5- or 6-membered ring,
R$_{30}$ is cyano or a radical of formula

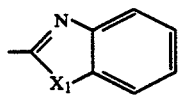

wherein X$_1$ is —NH, —N—C$_1$-C$_4$alkyl, O or S,
R$_{31}$ is hydrogen or cyano,
R$_{32}$ is hydrogen or C$_1$-C$_4$alkyl,
R$_{33}$ and R$_{34}$ are each independently of the other unsubstituted or substituted C$_1$-C$_6$alkyl, or R$_{33}$ and R$_{34}$, together with the linking nitrogen atom, are a 5- or 6-membered ring,
R$_{35}$ and R$_{36}$ are each independently of the other C$_1$-C$_{12}$alkyl,
R$_{37}$ is hydrogen, C$_1$-C$_4$alkyl or C$_2$-C$_4$alkenyl,
R$_{38}$ is C$_1$-C$_6$alkyl,
R$_{39}$ is C$_1$-C$_6$alkyl or phenyl-C$_1$-C$_6$alkyl,
R$_{40}$ and R$_{41}$ are each independently of the other C$_1$-C$_4$alkyl,
Y$_1$ is a radical of formula (15) or of formula

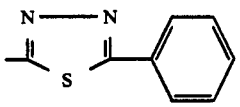

m is 0 or 1,
R$_{42}$ is C$_1$-C$_6$alkoxy, C$_1$-C$_6$alkoxy-C$_2$-C$_4$alkoxy, C$_1$-C$_4$alkoxycarbonyl-C$_2$-C$_4$alkoxy or C$_1$-C$_4$alkoxy-C$_1$-C$_4$alkoxycarbonyl-C$_2$-C$_4$alkoxy, and
R$_{43}$ is hydrogen, phenoxy or phenylthio.

The present invention postulates using, instead of the aqueous liquors describe above, dye liquors in which water is replaced by supercritical carbon dioxide. The expression "supercritical carbon dioxide" will be understood as meaning CO$_2$ whose pressure and temperature are above the critical pressure and the critical temperature. Supercritical CO$_2$ has approximately the viscosity of the corresponding gas and a density which is approximately comparable to the density of the liquified gas.

The process of this invention has a number of advantages. Because the supercritical CO$_2$ used in the process does not pass into the effluent, but is reused after the dyeing process, no contamination of the effluent occurs. Further, compared with the aqueous systems, the mass transfer reactions necessary for dyeing the textile substrate proceed substantially faster, so that in turn the textile substrate to be dyed can be penetrated particularly well and rapidly by the dye liquor. When dyeing wound packages by the process of the invention, no unlevelness occurs with respect to penetration of the packages, which unlevelness is regarded as responsible for causing listing defects in the conventional process for the beam dyeing of flat goods. Also, the novel process does not give rise to the undesirable agglomeration of disperse dyes which from time to time occurs in conventional dyeing with disperse dyes. Thus the known lightening of disperse dyes and hence the spotting which may occur in conventional dyeing processes carried out in aqueous systems are avoided by using the process of the invention.

A further advantage of the novel process is that it is possible to use disperse dyes which consist exclusively of the actual dye and do not contain the customary dispersants and diluents. In addition, milling can be dispensed within the case of many dyes.

The azo dyes of formula (1) used in the novel process are preferably those in which D is a diazo component selected from the group consisting of:

1. aniline which is substituted by chloro, cyano, C$_1$-C$_4$alkyl, C$_1$-C$_4$alkylcarbonylamino, C$_1$C$_4$alkylphenylcarbonyl, C$_1$-C$_{12}$alkoxycarbonyl, phenylcarbonyl, phenylcarbonylamino, phenylsulfonyloxy, phenylazo or tetrahydrofurylmethoxycarbonyl,
2. nitroaniline, unsubstituted or substituted by chloro, bromo, nitro, cyano, C$_1$-C$_4$alkyl, C$_1$-C$_4$alkoxy, C$_1$-C$_4$alkoxycarbonyl, C$_1$-C$_4$alkylsulfonyl or phenylcarbonyl, 3. 2-aminobenzothiazole or 3-aminobenzisothiazole, each unsubstituted or substituted by chloro, bromo or nitro,
4. 5-amino-1,2,4-thiadiazole or 5-amino-1,3,4-thiadiazole, each unsubstituted or substituted by $C_1$-$C_4$-akylthio or $C_1$-$C_4$alkoxycarbonyl-$C_1$-$C_4$alkylthio,
5. 2-aminothiophene, unsubstituted or substituted by nitro, cyano, $C_1$-$C_4$alkylcarbonyl, $C_1$-$C_4$alkoxycarbonyl or phenylazo,
6. 2-amino-1,3-thiazole, unsubstituted or substituted by nitro,
7. 4-aminophthalimide, unsubstituted or substituted at the imide nitrogen by $C_1$-$C_4$alkyl and/or substituted in the phenyl ring by CN,
8. 2-aminoimidazole, unsubstituted or substituted by cyano or cyano-$C_1$-$C_4$alkyl,
9. 1-amino-4-phenylazonaphthalene.

It is preferred to use those dyes of formula (1), wherein D is a diazo component selected from the group consisting of:
1a. aniline substituted by $C_1$-$C_4$alkylcarbonylamino; $C_1$-$C_4$alkylphenylcarbonyl, $C_1$-$C_{12}$alkoxycarbonyl, phenylcarbonylamino, phenylsulfonyloxy, phenylazo or chloro,
2a. nitroaniline, unsubstituted or substituted by chloro, bromo, cyano, nitro or $C_1$-$C_4$alkoxy,
3a. 2-aminobenzothiazole or 3-aminobenzisothiazole, each substituted by chloro, bromo or nitro,
4a. 5-amino-1,2,4-thiadiazole which is substituted by $C_1$-$C_4$alkoxycarbonyl-$C_2$-$C_4$alkylthio,
5a. nitro- or cyano-substituted 2-aminothiophene which is additionally substituted by at least one member selected from the group consisting of nitro, $C_1$-$C_4$alkylcarbonyl, $C_1$-$C_4$alkoxycarbonyl and phenylazo,
6a. 2-amino-5-nitro-1,3-thiazole,
7a. N—$C_1$-$C_4$alkyl-4-amino-5-cyanophthalimide,
8a. 1-cyanomethyl-2-amino-4,5-dicyanimidazole.

Among these dyes, those dyes are particularly suitable for the process of this invention in which D is a diazo component selected from the group consisting of:
1b. aniline which is substituted by acetylamino, $C_3$-$C_8$alkoxycarbonyl, phenylsulfonyloxy, phenylazo or chloro,
2b. nitroaniline which is additionally substituted by at least one member selected from the group consisting of chloro, bromo, cyano and nitro,
3b. 2-amino-6-nitrobenzothiazole or 2-aminobenzothiazole which is substituted by two chlorine atoms, or 3-amino-5-nitrobenzisothiazole,
4b. 5-amino-3-$C_1$-$C_2$alkoxycarbonyl-$C_2$-$C_4$alkylthio-1,2,4-thiadiazole,
5b. 2-amino-3-nitro-5-$C_1$-$C_4$alkylcarbonylthiophene,
6b. 2-amino-5-nitro-1,3-thiazole,
7b. N—$C_1$-$C_2$alkyl-4-amino-5-cyanophthalimide.

The azo dyes of formula (1) used in the process of this invention are preferably those in which K is a coupling component selected from the group consisting of:
1. pyridine derivatives of formula

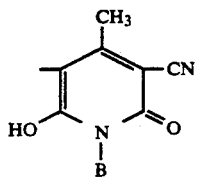

(17)

wherein B is $C_1$-$C_{16}$alkyl, unsubstituted or substituted by phenyl, phenoxy, hydroxy or $C_1$-$C_4$alkoxy,
2. aniline derivatives of formula

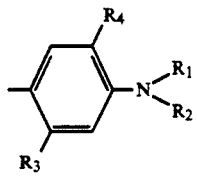

(18)

wherein
$R_1$ and $R_2$ are each independently of the other hydrogen or $C_1$-$C_6$alkyl which is unsubstituted or substituted by cyano, hydroxy, $C_1$-$C_4$alkylcarbonyloxy, phenylcarbonyloxy, cyano-$C_1$-$C_4$alkoxy, phenyl, phenoxy-$C_1$-$C_4$-alkoxy, succinimido or $C_1$-$C_4$alkoxycarbonyl,
or wherein $R_1$ and $R_2$, together with the linking nitrogen atom, form a 5- or 6-membered ring,
$R_3$ is hydrogen, chloro, $C_1$-$C_4$alkyl, $C_1$-$C_4$alkoxy, $C_1$-$C_4$alkylcarbonylamino, $C_1$-$C_4$alkylsulfonylamino, phenylcarbonylamino or cyano-$C_1$-$C_4$alkylcarbonylamino, and
$R_4$ is hydrogen, chloro, bromo, $C_1$-$C_4$alkyl or $C_1$-$C_4$alkoxy;
3. pyrazole derivatives of formula

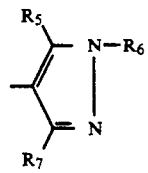

(19)

wherein
$R_5$ is hydroxy or imino,
$R_6$ is phenyl or a group of formula

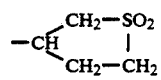

(20)

and
$R_7$ is $C_1$-$C_4$alkyl or $C_1$-$C_4$alkoxycarbonyl;
4. phenol or 1-naphthol, each unsubstituted or substituted by $C_1$-$C_4$alkyl or a group of formula

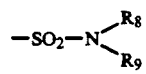

(21)

wherein $R_8$ is $C_1$-$C_4$alkyl and $R_9$ is hydroxy-$C_1$-$C_4$alkyl or $C_1$-$C_4$alkylcarbonyloxy-$C_1$-$C_4$alkyl;
5. pyrimidine derivatives of formula

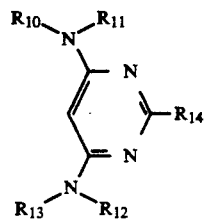

(22)

wherein $R_{10}$, $R_{11}$, $R_{12}$ and $R_{13}$ are each independently of one another hydrogen, $C_1$-$C_4$alkyl, hydroxy-$C_1$-$C_4$alkyl, cyano-$C_1$-$C_4$alkyl or $C_1$-$C_4$alkoxy-$C_1$-$C_4$alkyl, and $R_{14}$ is unsubstituted or substituted phenyl or naphthyl;

6. cyanoaminopyridines of formula

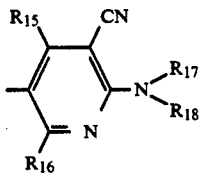

wherein $R_{15}$ is amino or $C_1$-$C_4$alkyl, $R_{16}$ is amino, NH—$C_1$-$C_4$alkyl or —NH—$C_1$-$C_4$hydroxyalkyl, and $R_{17}$ and $R_{18}$ are each independently of the other hydrogen or $C_1$-$C_8$alkyl which is unsubstituted or substituted by hydroxy, cyano, chloro, bromo, $C_1$-$C_8$alkoxy, phenoxy, phenyl or phenoxy-$C_1$-$C_4$alkoxy.

It is preferred to use those dyes of formula (1), wherein K is a coupling component selected from the group consisting of:

1a. pyridine derivatives of formula (17), wherein B is branched $C_1$-$C_{12}$alkyl or $C_1$-$C_4$alkoxy-$C_2$-$C_4$alkyl;

2a. aniline derivatives of formula (18), wherein $R_1$ and $R_2$ are each independently of the other $C_1$-$C_4$alkyl which is unsubstituted or substituted by hydroxy, cyano, $C_1$-$C_4$alkylcarbonyloxy, phenylcarbonyloxy, phenyl, phenoxy-$C_1$-$C_4$alkoxy or $C_1$-$C_4$alkoxycarbonyloxy, $R_3$ is hydrogen, chloro, methyl or methoxy and $R_4$ is hydrogen or methoxy;

3a. pyrazole derivatives of formula (19), wherein $R_5$ is hydroxy, $R_6$ is phenyl and $R_7$ is $C_1$-$C_4$alkyl or $C_1$-$C_4$alkoxycarbonyl;

4a. phenol which is substituted by $C_1$-$C_4$alkyl or phenyl, or 1-naphthol which is substituted by a group of formula (21), wherein $R_8$ is $C_1$-$C_2$alkyl and $R_9$ is hydroxy-$C_1$-$C_4$alkyl or $C_1$-$C_2$alkylcarbonyloxy-$C_1$-$C_4$alkyl;

5a. pyrimidine derivatives of formula (22), wherein $R_{10}$ and $R_{12}$ are each hydrogen, $R_{11}$ and $R_{13}$ are each independently of the other $C_1$-$C_4$alkyl or hydroxy-$C_1$-$C_4$alkyl and $R_{14}$ is phenyl;

6a. cyanoaminopyridines of formula (23), wherein $R_{15}$ is amino or $C_1$-$C_2$alkyl, $R_{16}$ is amino or —NH—$C_1$-$C_2$hydroxyalkyl, $R_{17}$ is hydrogen and $R_{18}$ is $C_1$-$C_8$alkyl which is unsubstituted or substituted by $C_1$-$C_8$alkoxy, phenoxy or phenoxy-$C_1$-$C_4$alkoxy.

Dyes of formula (1) which are very particularly suitable for use in the process of this invention are those in which D is a diazo component selected from the group consisting of:

1b. aniline which is substituted by acetylamino, $C_3$-$C_8$alkoxycarbonyl, phenylsulfonyloxy or phenylazo;

2b. nitroaniline which is additionally substituted by at least one member selected from the group consisting of chloro, bromo, cyano and nitro;

3b. 2-amino-6-nitrobenzothiazole or 2-aminobenzothiazole which is substituted by two chlorine atoms, or 3-amino-5-nitrobenzoisothiazole, and K is a coupling component selected from the group consisting of;

1a. pyridine derivatives of formula (17), wherein B is branched $C_1$-$C_{12}$alkyl or $C_1$-$C_4$alkoxy-$C_2$-$C_4$alkyl;

2a. aniline derivatives of formula (18), wherein $R_1$ and $R_2$ are each independently of the other $C_1$-$C_4$alkyl which is unsubstituted or substituted by hydroxy, cyano, $C_1$-$C_4$alkylcarbonyloxy, phenylcarbonyloxy, phenyl, phenoxy-$C_1$-$C_4$alkoxycarbonyloxy, $R_3$ is hydrogen, chloro, methyl or methoxy, and $R_4$ is hydrogen or methoxy.

A further preferred embodiment of the process of this invention comprises the use of an anthraquinone dye of formula (2), wherein $Z_1$ and $Z_2$ are each hydrogen, $R_{19}$ is hydrogen, $C_1$-$C_{12}$alkyl or phenyl-substituted $C_1$-$C_{12}$alky, phenyl or phenyl which is substituted by hydroxyalkyl or $C_1$-$C_4$alkylsulfonyloxy, $R_{20}$ is hydrogen, chloro, $C_1$-$C_2$alkoxy, $C_1$-$C_2$alkoxycarbonyl, $C_1$-$C_6$alkyltetrazolyl, phenoxysulfonyl, phenoxy or phenoxy which is substituted by $C_1$-$C_8$alkoxy, $C_1$-$C_8$alkylthio, $C_1$-$C_8$alkyl, cyano-$C_1$-$C_4$alkyl or a radical of formula

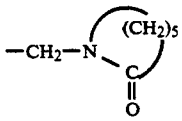

or is a radical of formula

—O—A—O—Y wherein A is $C_2$-$C_4$alkylene and Y is $C_1$-$C_4$alkoxycarbonyl, phenyl or phenoxycarbonyl, in which the phenyl moieties can be substituted by $C_1$-$C_4$alkoxy or $C_1$-$C_4$alkyl, $R_{21}$ is hydrogen, chloro, cyano or phenoxy which may be substituted by $C_1$-$C_4$alkyl or $C_1$-$C_4$alkoxy, and $R_{22}$ is hydroxy, amino or a —$NHR_{26}$ radical, wherein $R_{26}$ is $C_1$-$C_{12}$alkyl which may be substituted by phenyl.

It is preferred to use those dyes of formula (2) wherein $R_{19}$ is hydrogen, branched $C_4$-$C_8$alkyl which may be substituted by phenyl, or phenyl which is substituted by hydroxy-$C_2$-$C_3$alkyl or $C_1$-$C_4$alkylsulfonyloxy $R_{20}$ is hydrogen, phenoxy which may be substituted by $C_1$-$C_4$alkyl or $C_1$-$C_4$alkoxy, or is a radical

wherein Y is pheny, $C_1$-$C_4$alkylphenyl, $C_1$-$C_4$alkoxyphenyl, phenoxycarbonyl or $C_1$-$C_4$alkoxycarbonyl, $R_{21}$ is hydrogen, and $R_{22}$ is hydroxy, amino or $C_1$-$C_8$alkyl or phenyl-substituted $C_1$-$C_8$alkyl.

A further preferred embodiment of the process of this invention comprises the use of an anthraquinone dye of formula (3), wherein X is amino or nitro, $R_{23}$ is hydroxy, amino or $C_1$-$C_4$alkylamino, n is 0, 1 or 2, and $R_{24}$ is hydroxy, amino, $C_1$-$C_4$alkylamino, phenylamino or hydroxy-$C_2$-$C_4$alkylphenylamino;

or the use of an anthraquinone dye of formula (4), wherein

A is a $C_2$-$C_4$alkylene radical, and $R_{25}$ is $C_1$–$C_4$alkyl, $C_1$–$C_4$alkoxy, $C_1$–$C_4$alkoxyethoxy, phenoxy, phenoxyethoxy or $C_1$–$C_4$alkoxycarbonylethoxy.

A further preferred embodiment of the process of this invention comprises the use of a dye of formula (5), wherein
$R_{30}$ is cyano or a radical of formula (15), wherein $X_1$ is —NH,
$R_{31}$ is hydrogen or cyano,
$R_{32}$ is hydrogen, methyl or ethyl,
$R_{33}$ is $C_1$–$C_4$alkyl,
$R_{34}$ is $C_1$–$C_4$alkyl which may be substituted by cyano, phenyl, phenoxy, phenylthio, phenylcarbonyloxy, phenylaminocarbonyloxy or a radical of formula

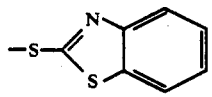 (17)

or wherein $R_{29}$ and $R_{33}$, together with the N atom and the two linking carbon atoms, form a tetrahydropyridine ring containing 0 to 4 methyl groups.

Further preferred embodiments of the process of this invention comprise the use of a dye of formula (6), wherein
$R_{32}$ is hydrogen, methyl or ethyl, and
$R_{35}$ and $R_{36}$ are each $C_4$–$C_8$alkyl,
or the use of a dye of formula (7), wherein
$R_{37}$ is hydrogen or allyl,
$R_{38}$ is $C_1$–$C_4$alkyl, and
$R_{39}$ is $C_1$–$C_4$alkyl or phenyl-$C_1$–$C_4$alkyl,
or the use of a dye of formula (8), wherein
$R_{40}$ and $R_{41}$ are each methyl or ethyl,
$R_{31}$ is hydrogen or cyano, and
$Y_1$ is a radical of formula

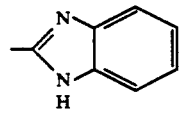

which may be substituted in the phenyl ring by $C_1$–$C_4$alkyl or chloro, or the use of a dye of formula (9), wherein m is 1, or the use of a dye of formula (10), wherein $R_{42}$ is $C_1$–$C_4$alkoxy or $C_1$–$C_4$alkoxy-$C_2$–$C_4$alkoxycarbonyl-$C_2$–$C_4$alkoxy, or the use of a dye of formula (11), wherein $R_{43}$ is hydrogen or phenylthio.

Throughout this specification, alkyl will be generally understood as meaning straight-chain, branched or cyclic alkyl groups. Such groups are typically methyl, ethyl, propyl, isopropyl, butyl, isobutyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, cyclopentyl, cyclohexyl, methylcyclohexyl, as well as the corresponding isomers. The alkyl radicals preferably contain 1 to 4 carbon atoms.

These alkyl radicals may be substituted, for example by halogen, hydroxy, alkoxy, cyano or phenyl. Illustrative examples of such substituted alkyl radicals are hydroxyethyl, methoxymethyl, ethoxyethyl, cyanoethyl, propoxypropyl, benzyl, chloroethyl or cyanoethyl.

Suitable alkoxy radicals are preferably those containing 1 to 4 carbon atoms, such as methoxy, ethoxy, propoxy, isopropoxy, n-butoxy, isobutoxy or tert-butoxy.

The phenyl radiclas may also be substituted, for example by chloro, bromo, $C_1$–$C_4$alkyl, $C_1$–$C_4$alkoxy, nitro or cyano.

Halogen is fluoro, iodo, bromo or, preferably, chloro.

In the dyes of formula (5), $R_{29}$ and $R_{33}$, together with the nitrogen atom and the two linking carbon atoms, may form a 5- or 6-membered ring which may contain a further hetero atom, such as oxygen or sulfur. Furthermore, the ring may be substituted, for example by hydroxy, alkoxy, alkyl, halogen, CN or phenyl, or carry a further fused benzene ring. Preferred rings which are formed by $R_{29}$ and $R_{33}$ together with the nitrogen atom and the linking carbon atoms are dihydrooxazine rings and di- or tetrahydropyridine rings which carry 0 to 4 methyl groups.

$R_{33}$ and $R_{34}$, together with the linking nitrogen atom, may also form a piperidine, morpholine or piperazine radical. The piperazine radical may be substituted at the nitrogen atom which is not attached to the phenyl ring by $C_1$–$C_4$alkyl or hydroxy-$C_1$–$C_4$alkyl or amino-$C_1$–$C_4$alkyl. The preferred substituent is hydroxyethyl.

On account of their good tinctorial properties in the novel process, the dyes listed in the Examples are especially preferred.

The dyes of formula

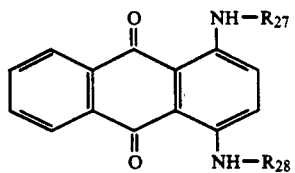 (18)

wherein $R_{27}$ and $R_{28}$ are each independently of the other phenyl-$C_3$–$C_8$alkyl, are novel and constitute a further object of the invention.

Those dyes of formula (18) are preferred wherein $R_{27}$ and $R_{28}$ are each phenyl-$C_3$–$C_6$alkyl.

The dyes of formula (18) are obtained in a manner known per se e.g. by reacting 1,4-di-haloanthraquinone, wherein halogen is chloro or bromo, with an amine $R_{27}$—$NH_2$ and/or $R_{28}$—$NH_2$.

The other dyes of formulae (1) to (14) are known or can be prepared in a manner known per se.

The process of this invention is suitable for dyeing regenerated and, preferably, synthetic hydrophobic fibre materials, especially textile materials. The process of the invention can also be used for dyeing textile materials made from blends which contain such regenerated or synthetic hydrophobic fibre materials.

Preferred regenerated textile materials are cellulose secondary acetate and cellulose triacetate.

Synthetic hydrophobic textile materials consist mainly of linear, aromatic polyesters, typically those of terephthalic acid and glycols, preferably ethylene glycol or condensates of terephthalic acid and 1,4-bis(hydroxymethyl)cyclohexane; of polycarbonates, for example of α,α-dimethyl-4,4'-dihydroxy-diphenylmethane and phosgene, of fibres derived from polyvinyl chloride, polypropylene or polyamide, such as polyamide 6.6, polyamide 6.10, polyamide 6, polyamide 11 or poly(1,4-phenyleneterephthalamide).

The dyeing temperature in the process of the invention depends substantially on the substrate to be dyed.

Normally it is in the range from c. 90° to 200° C., preferably from c. 100° to 150° C.

The pressure must be at least so great that the $CO_2$ is in the supercritical state. The pressure is preferably in the range from c. 73–400 bar, preferably from c. 150–250 bar.

The liquor ratio (mass ratio of textile material:$CO_2$) in the process of this invention depends on the goods to be treated and their make-up. Normally it will vary between 1:2 to 1:100, preferably from c. 1:5 to 1:75. If it is desired to dye, for example, polyester yarns which are wound onto appropriate cheeses, then dyeing according to the process of the invention is preferably carried out at relatively short liquor ratios, i.e. liquor ratios from 1:2 to 1:5. Such short liquor ratios create problems in the conventional dyeing process carried out in an aqueous system, as the danger often exists that the finely dispersed systems will agglomerate because of the high dye concentration. This danger does not arise in the process of this invention.

There are several possiblities of purifying the supercritical $CO_2$ after the dyeing process. For example, the residual dye in the supercritical $CO_2$ can be adsorbed or absorbed over appropriate filters. Particularly suitable filters for the purpose are the per se known silica gel, kieselguhr, carbon, zeolith and alumina filters.

A further possibility is to remove the dyes remaining in the supercritical $CO_2$ by a temperature and/or pressure reduction and/or by an increase in volume. In this case the supercritical $CO_2$ is converted into the corresponding gas, which is then collected and, after reconversion into the supercritical state, used for dyeing further substrates. The dyes precipitate as liquid or solid dyes and are collected and reused for further dyeing.

The invention is illustrated by the following non-limitative Examples.

EXAMPLE 1

24.5 μmol of the dye of formula

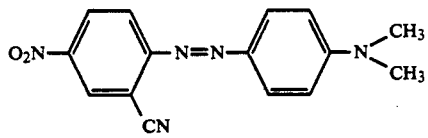

are charged to the bottom of an autoclave having a volume of 500 ml. Then 330 g of $CO_2$ are weighed in in solid form (dry ice). A strip of polyester fabric (5 g) is wound around the sensors for pressure and temperature built into the cover of the autoclave and fastened with a thread.

The autoclave is closed and the temperature falls very rapidly to c. $-10°$ C. When the temperature has reached 0° C., the contents of the autoclave are heated to 130° C. at a rate of c. 3° C./min, the pressure rising to c. 200 bar. These conditions are kept constant for 30 minutes. The contents of the autoclave are cooled with compressed air while the heating is switched off. Pressure and temperature decrease exponentially. After two hours the pressure is c. 70 bar and the pressure is released by opening a valve.

The polyester fabric is dyed in a ruby red shade in comparable quality to that obtained when dyeing by conventional methods from an aqueous liquor. In particular the fastness to rubbing, light and washing of the dyeing are equally good.

The degree of exhaustion of the dye is ca. 98%.

EXAMPLES 2–46

Dyeings on polyester fabric can also be obtained by the method described in Example 1 with the following dyes:

-continued
| Example | Dye |
|---|---|
| 7 | 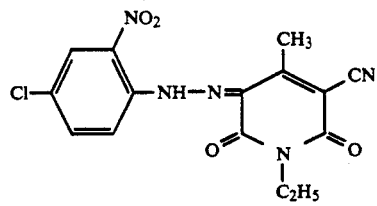 |
| 8 | 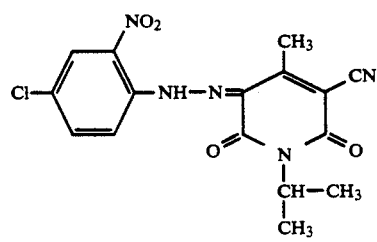 |
| 9 | 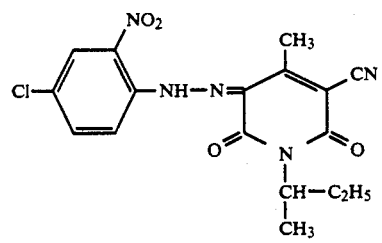 |
| 10 | 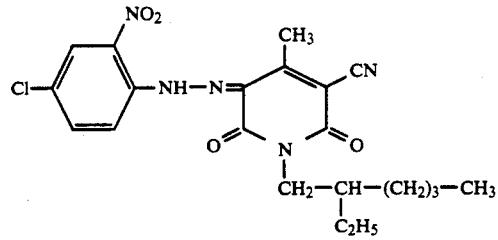 |
| 11 | 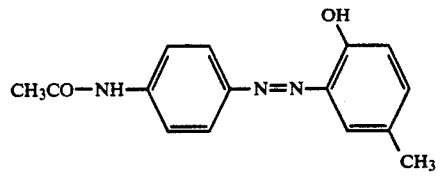 |
| 12 | 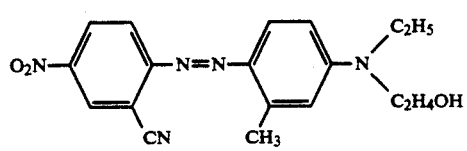 |
| 13 | 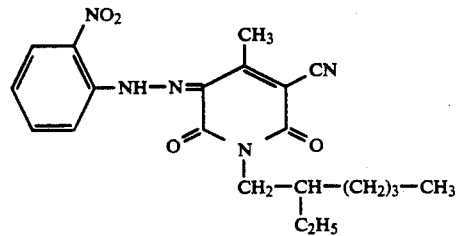 |

-continued

| Example | Dye |
|---------|-----|
| 14 | (structure: 3,4-dichlorophenylhydrazone of methyl-cyano-pyridinedione with N-CH₂−CH(C₂H₅)−(CH₂)₃−CH₃ substituent) |
| 15 | (structure: phenyl-SO₂−O−phenyl−NH−N= hydrazone of methyl-cyano-pyridinedione with N-CH(CH₃)₂ substituent) |
| 16 | (structure: (CH₃)₂CH−OOC−phenyl(NO₂)−NH−N= hydrazone of methyl-cyano-pyridinedione with N-CH₂−CH(C₂H₅)−(CH₂)₃−CH₃ substituent) |
| 17 | (structure: phenyl−N=N−phenyl−NH−N= hydrazone of methyl-cyano-pyridinedione with N-C₃H₆−O−CH(CH₃)₂ substituent) |
| 18 | CH₃CO−NH−〔phenyl〕−N=N−〔2-hydroxy-5-ethylphenyl〕 |
| 19 | phenyl−N=N−〔phenyl〕−N=N−〔4-hydroxy-3-methylphenyl〕 |
| 20 | 2,6-dichloro-4-nitrophenyl−N=N−〔phenyl〕−N(C₂H₄CN)(C₂H₄O−CO−CH₃) |
| 21 | 4-nitrophenyl−N=N−〔phenyl〕−N(C₂H₄CN)(C₂H₅) |

-continued

| Example | Dye |
|---|---|
| 22 | (structure: 2-cyano-4-nitrophenyl azo coupled to 4-(N-ethyl-N-cyanoethylamino)phenyl) |
| 23 | (structure: benzene ring with two C(=O)-NHC₂H₅ groups, CN, azo-linked to 4-[N,N-bis(2-acetoxyethyl)amino]phenyl) |
| 24 | CH₃OOC—C₂H₄—S-substituted thiadiazole azo-linked to 4-(N-ethyl-N-hydroxyethylamino)phenyl |
| 25 | 6-nitrobenzothiazol-2-yl azo 3-methyl-4-[N-cyanoethyl-N-acetoxyethylamino]phenyl |
| 26 | 6-nitrobenzothiazol-2-yl azo 4-[N,N-bis(acetoxyethyl)amino]phenyl |
| 27 | 5,6-dichlorobenzothiazol-2-yl azo 4-(N-methyl-N-phenylpropyl amino)phenyl |
| 28 | 2-cyano-4-nitrophenyl azo 4-[N,N-bis(acetoxyethyl)amino]phenyl |
| 29 | phenyl-azo-phenyl-azo-naphthol with SO₂N(CH₃)(C₂H₄OH) |
| 30 | benzoisothiazolyl coupled to 4-(N,N-diethylamino)-2-(acetylamino)phenyl |

-continued

| Example | Dye |
|---------|-----|
| 31 | 2,4-dinitro-6-cyano substituted benzene azo coupled to 4-(N,N-diethylamino)-2-methylphenyl (with CN at position 6) |
| 32 | similar to 31 but with N-ethyl, N-(3-phenylpropyl) amino group |
| 33 | 5-nitro-benzisothiazole azo coupled to 4-(N,N-diethylamino)phenyl |
| 34 | 3-nitro-5-nitro-thiophene azo coupled to 4-[N,N-bis(2-acetoxyethyl)amino]phenyl |
| 35 | 3-nitro-5-acetyl-thiophene azo coupled to 4-(N,N-diethylamino)phenyl |
| 36 | 3-nitro-5-acetyl-thiophene azo coupled to 4-[N-ethyl-N-(2-hydroxyethyl)amino]phenyl |
| 37 | 2,4-dinitro-6-cyano (with CN) benzene azo coupled to 4-(N,N-diethylamino)phenyl |
| 38 | 2-bromo-4-nitro-6-nitro benzene azo coupled to 4-[N-ethyl-N-benzyl-amino]-2-acetamido-phenyl |
| 39 | 2-ethylhexyl ester of 3-nitro-4-[(1-methyl-3-cyano-4-methyl-6-oxo-pyridin-2(1H)-one-5-yl)hydrazono] benzoate |

-continued

| Example | Dye |
|---|---|
| 40 | (structure: phenyl-SO₂-O-phenyl-NH-N=... with CH₃, CN, and N-CH₃ pyridinedione) |
| 41 | H₅C₂-S-C(=S)-N=N ring-C(=N-N=)-phenyl-N(C₃H₇)₂ with HN-COCH₃ |
| 42 | 2-Cl-4-NO₂-6-NO₂-phenyl-N=N-phenyl(OCH₃)(NHCOCH₃)-N(CH₂-phenyl)(CH₂-CH₂-O-C(=O)-CH₃) |
| 43 | 2-Cl-4-NO₂-6-CN-phenyl-N=N-C(=C(NH₂)-C(CN)=C(NH-C₃H₆-O-C₂H₄-OCH₃)-N=C(NH₂)) |
| 44 | 2,6-diCl-4-NO₂-phenyl-N=N-phenyl-N(C₂H₄OH)₂ |
| 45 | 4-Cl-2-NO₂-phenyl-NH-N=... CH₃, CN pyridinedione with N-CH₂-CH(CH₃)₂ |
| 46 | 4-Cl-2-NO₂-phenyl-NH-N=... CH₃, CN pyridinedione with N-n-C₆H₁₃ |

EXAMPLE 47

24.5 μmol of the dye of formula

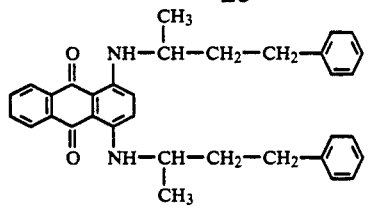

are charged to the bottom of an autoclave having a volume of 500 ml. Then 330 g of $CO_2$ are weighed in in solid form (dry ice). A strip of polyester fabric (5 g) is wound around the sensors for pressure and temperature built into the cover of the autoclave and fastened with a thread.

The autoclave is closed and the temperature falls very rapidly to c. $-10°$ C. When the temperature has reached $0°$ C., the contents of the autoclave are heated to $130°$ C. at a rate of c. $3°$ C./min, the pressure rising to c. 200 bar. These conditions are kept constant for 30 minutes. The contents of the autoclave are cooled with compressed air while the heating is switched off. Pressure and temperature decrease exponentially. After two hours the pressure is c. 70 bar and the pressure is released by opening a valve.

The polyester fabric is dyed in a blue shade in comparable quality to that obtained when dyeing by conventional methods from an aqueous liquor. In particular the fastness to rubbing, light and washing of the dyeing are equally good.

The degree of exhaustion of the dye is ca. 90%.

EXAMPLES 48–63

Dyeings on polyester fabric can also be obtained by the method described in Example 47 with the following dyes:

| Example | Dye |
|---|---|
| 48 | 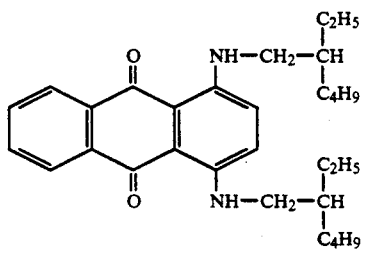 |
| 49 | 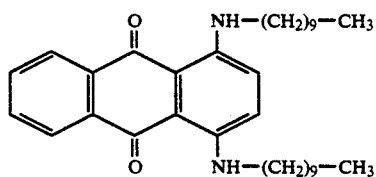 |
| 50 | 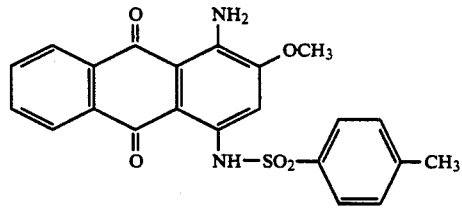 |
| 51 | 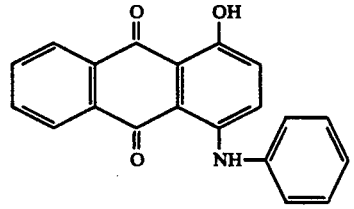 |
| 52 | 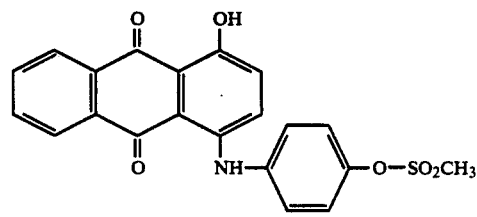 |

-continued
| Example | Dye |
|---|---|
| 53 | 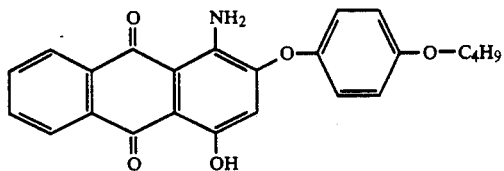 |
| 54 | 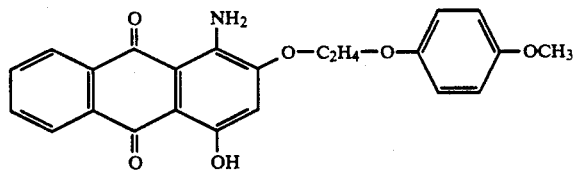 |
| 55 | 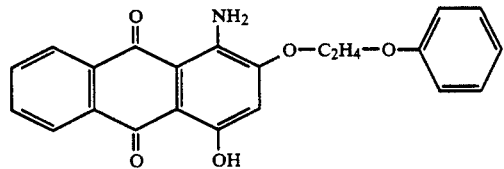 |
| 56 | 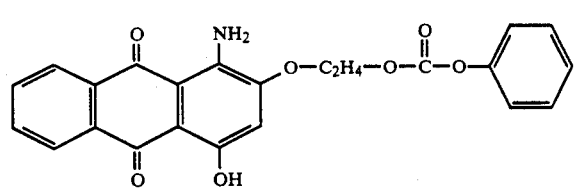 |
| 57 | 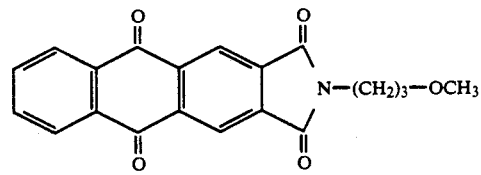 |
| 58 | 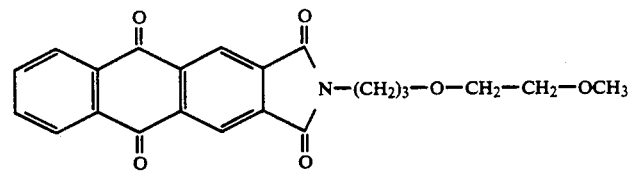 |
| 59 | 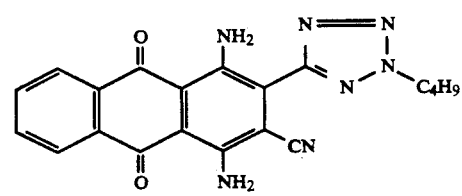 |
| 60 | 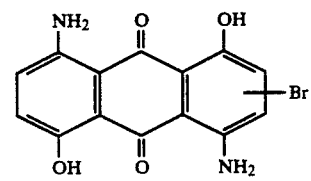 |

| Example | Dye |
|---|---|
| 61 | 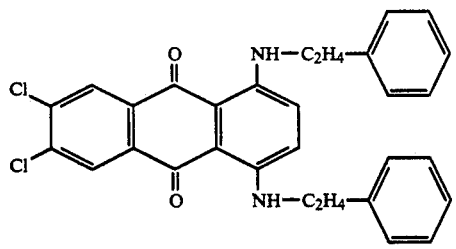 |
| 62 | 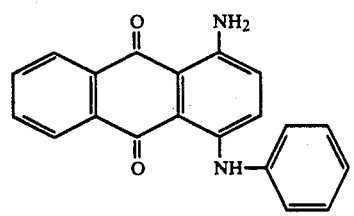 |
| 63 | 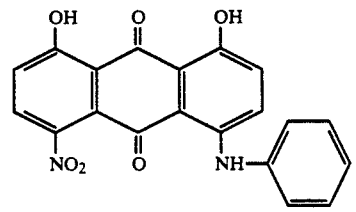 |

EXAMPLE 64

24.5 μmol of the dye of formula

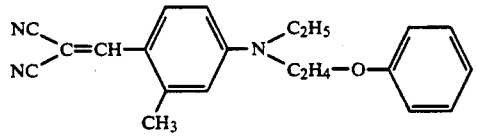

are charged to the bottom of an autoclave having a volume of 500 ml. Then 330 g of $CO_2$ are weighed in in solid form (dry ice). A strip of polyester fabric (5 g) is wound around the sensors for pressure and temperature built into the cover of the autoclave and fastened with a thread.

The autoclave is closed and the temperature falls very rapidly to c. −10° C. When the temperature has reached 0° C., the contents of the autoclave are heated to 130° C., at a rate of c. 3° C./min, the pressure rising to c. 200 bar. These conditions are kept constant for 30 minutes. The contents of the autoclave are cooled with compressed air while the heating is switched off. Pressure and temperature decrease exponentially. After two hours the pressure is c. 70 bar and the pressure is released by opening a valve.

The polyester fabric is dyed in a yellow shade in comparable quality to that obtained when dyeing by conventional methods from an aqueous liquor. In particular the fastness to rubbing, light and washing of the dyeing are equally good.

EXAMPLES 65–78

Dyeings on polyester fabric can also be obtained by the method described in Example 64 with the following dyes:

| Example | Dye |
|---|---|
| 65 | 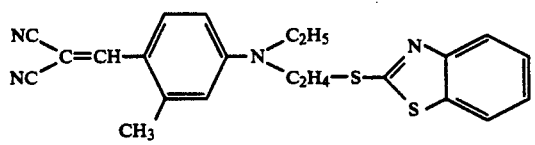 |
| 66 | 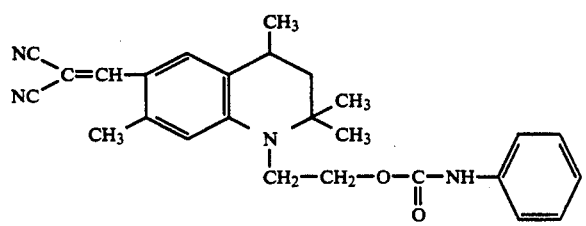 |

-continued
| Example | Dye |
|---|---|
| 67 | 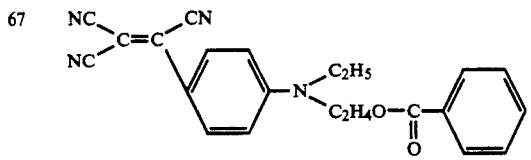 |
| 68 | 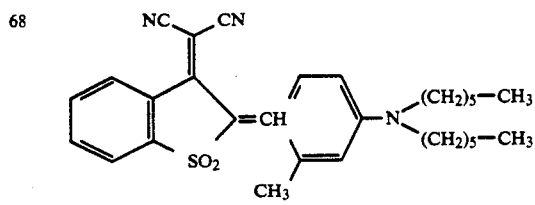 |
| 69 | 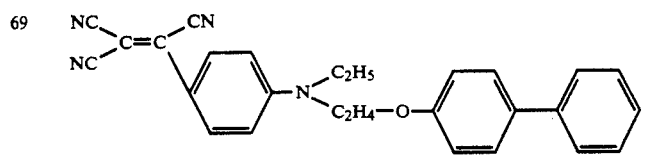 |
| 70 | 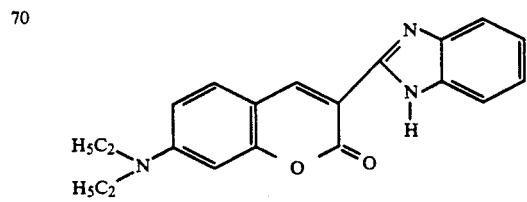 |
| 71 | 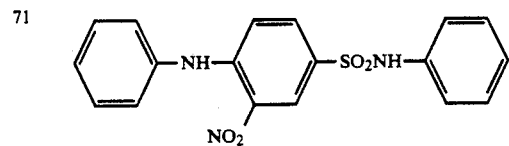 |
| 72 | 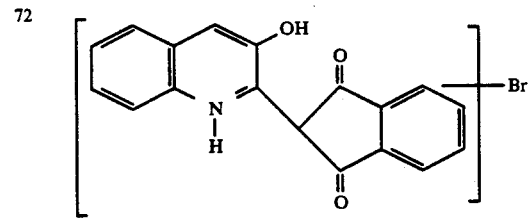 |
| 73 | 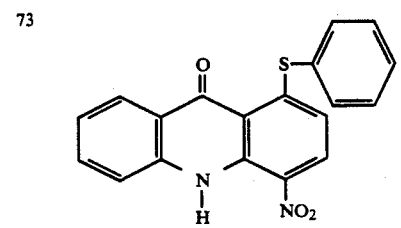 |

| Example | Dye |
|---|---|
| 74 | |
| 75 | |
| 76 | R: mixture of H and —S— |
| 77 | |
| 78 | |

What is claimed is:

1. A process for dyeing hydrophobic textile material with disperse dyes, which comprises treating said textile material in supercritical carbon dioxide with an azo dye of formula $$D-N=N-K \qquad (1)$$

wherein
D is the radical of an aromatic diazo component and K is the radical of a coupling component, or with an anthraquinone dye of formula

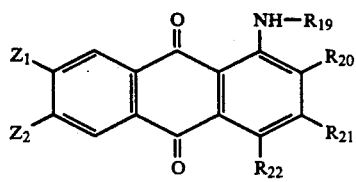

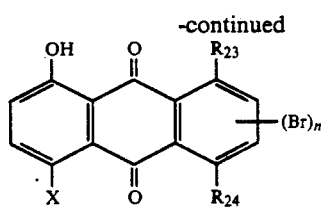
(3)

or

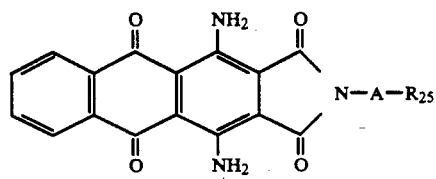
(4)

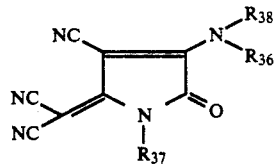
(7)

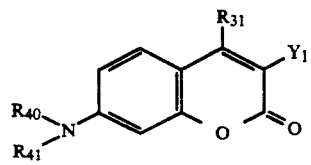
(8)

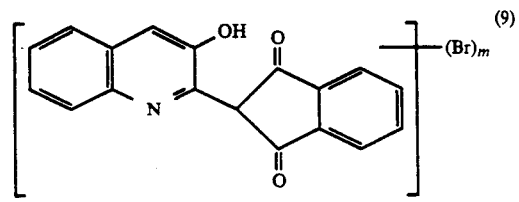
(9)

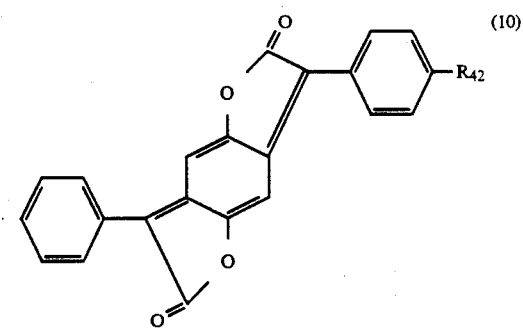
(10)

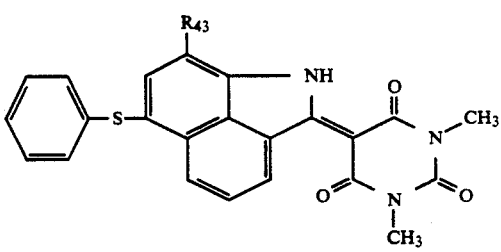
(11)

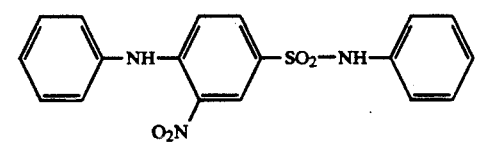
(12)

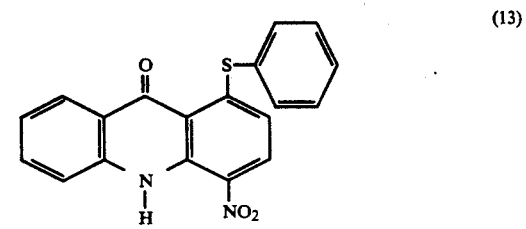
(13)

wherein $Z_1$ and $Z_2$ are each independently of the other hydrogen or halogen, $R_{19}$ is hydrogen or unsubstituted or substituted alkyl or phenyl, $R_{20}$ is hydrogen, chloro, $C_1$–$C_8$alkoxy, unsubstituted or substituted phenoxy, $C_1$–$C_4$alkoxycarbonyl, $C_1$–$C_8$alkyltetrazolyl, phenoxysulfonyl or a radical of formula

—O—A—O—Y wherein A is an alkylene radical of 2 to 6 carbon atoms and Y is unsubstituted or substituted phenyl, phenoxycarbonyl, phenylcarbonyl, $C_1$–$C_4$alkylcarbonyl or $C_1$–$C_4$alkoxycarbonyl, $R_{21}$ is hydrogen, chloro, unsubstituted or substituted phenoxy or cyano, $R_{22}$ is hydroxy, amino or a —$NHR_{26}$ radical, wherein $R_{26}$ is unsubstituted or substituted alkyl or phenylsulfonyl, X is amino or nitro, $R_{23}$ is hydroxy, amino or unsubstituted or substituted alkylamino, n is 0, 1 or 2, $R_{24}$ is hydroxy, amino or unsubstituted or substituted alkylamino or phenylamino, A is an alkylene radicalmof 2 bto Ccarbon aomesuad $R_{25}$ is $C_1$–$C_6$alkyl, $C_1$–$C_6$alkoxy, $C_1$–$C_6$alkoxy-$C_2$–$C_4$alkoxy, phenoxy, phenoxy-$C_2$–$C_4$alkoxy or $C_1$–$C_6$alkoxycarbonyl-$C_2$–$C_4$alkoxy, or with a dye of formula

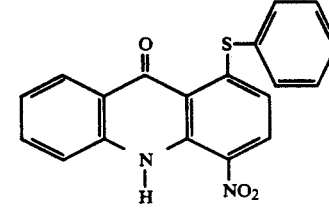
(5)

(6)

or

-continued

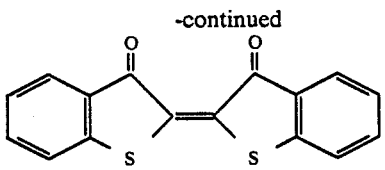

wherein $R_{29}$ is hydrogen or $R_{29}$ and $R_{33}$, together with the N atom and the two linking carbon atoms, are a 5- or 6-membered ring, $R_{30}$ is cyano or a radical of formula

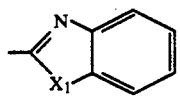

wherein $X_1$ is —NH, —N—$C_1$–$C_4$alkyl, O or S, $R_{31}$ is hydrogen or cyano, $R_{32}$ is hydrogen or $C_1$–$C_4$alkyl, $R_{33}$ and $R_{34}$ are each independently of the other unsubstituted or substituted $C_1$–$C_6$alkyl, or $R_{33}$ and $R_{34}$, together with the linking nitrogen atom, are a 5- or 6-membered ring, $R_{35}$ and $R_{36}$ are each independently of the other $C_1$–$C_{12}$alkyl, $R_{37}$ is hydrogen, $C_1$–$C_4$alkyl or $C_2$–$C_4$alkenyl, $R_{38}$ is $C_1$–$C_6$alkyl, $R_{39}$ is $C_1$–$C_6$alkyl or phenyl-$C_1$–$C_6$alkyl, $R_{40}$ and $R_{41}$ are each independently of the other $C_1$–$C_4$alkyl, $Y_1$ is a radical of formula (15) or of formula

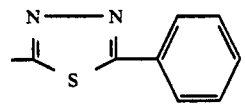

m is 0 or 1, $R_{42}$ is $C_1$–$C_6$alkoxy, $C_1$–$C_6$alkoxy-$C_2$–$C_4$alkoxy, $C_1$–$C_4$alkoxycarbonyl-$C_2$–$C_4$alkoxy or $C_1$–$C_4$alkoxy-$C_1$–$C_4$alkoxycarbonyl-$C_2$–$C_4$alkoxy, and $R_{43}$ is hydrogen, phenoxy or phenylthio.

2. A process according to claim 1, which comprises the use of an azo dye of formula (1), wherein D is a diazo component selected from the group consisting of:
 1. aniline substituted by chloro, cyano, $C_1$–$C_4$alkyl, $C_1$–$C_4$alkylcarbonylamino, $C_1$–$C_4$alkylphenylcarbonyl, $C_1$–$C_{12}$alkoxycarbonyl, phenylcarbonyl, phenylcarbonylamino, phenylsulfonyloxy, phenylazo or tetrahydrofurylmethoxycarbonyl,
 2. nitroaniline, unsubstituted or substituted by chloro, bromo, nitro, cyano, $C_1$–$C_4$alkyl, $C_1$–$C_4$alkoxy, $C_1$–$C_4$alkoxycarbonyl, $C_1$–$C_4$alkylsulfonyl or phenylcarbonyl,
 3. 2-aminobenzothiazole or 3-aminobenzisothiazole, each unsubstituted or substituted by chloro, bromo or nitro,
 4. 5-amino-1,2,4-thiadiazole or 5-amino-1,3,4-thiadiazole, each unsubstituted or substituted by $C_1$–$C_4$-alkylthio or $C_1$–$C_4$alkoxycarbonyl-$C_1$–$C_4$alkylthio,
 5. 2-aminothiophene, unsubstituted or substituted by nitro, cyano, $C_1$–$C_4$alkylcarbonyl, $C_1$–$C_4$alkoxycarbonyl or phenylazo,
 6. 2-amino-1,3-thiazole, unsubstituted or substituted by nitro,
 7. 4-aminophthalimide, unsubstituted or substituted at the imide nitrogen by $C_1$–$C_4$alkyl and/or substituted in the phenyl ring by CN,
 8. 2-aminoimidazole, unsubstituted or substituted by cyano or cyano-$C_1$–$C_4$alkyl,
 9. 1-amino-4-phenylazonaphthalene.

3. A process according to claim 2, wherein D is a diazo component selected from the group consisting of
 1a. aniline substituted by $C_1$–$C_4$alkylcarbonylamino; $C_1$–$C_4$alkylphenylcarbonyl, $C_1$–$C_{12}$alkoxycarbonyl, phenylcarbonylamino, phenylsulfonyloxy, phenylazo or chloro,
 2a. nitroaniline, unsubstituted or substituted by chloro, bromo, cyano, nitro or $C_1$–$C_4$alkoxy,
 3a. 2-aminobenzothiazole or 3-aminobenzisothiazole, each substituted by chloro, bromo or nitro,
 4a. 5-amino-1,2,4-thiadiazole which is substituted by $C_1$–$C_4$alkoxycarbonyl-$C_2$–$C_4$alkylthio,
 5a. nitro- or cyano-substituted 2-aminothiophene which is additionally substituted by at least one member selected from the group consisting of nitro, $C_1$–$C_4$alkylcarbonyl, $C_1$–$C_4$alkoxycarbonyl and phenylazo,
 6a. 2-amino-5-nitro-1,3-thiazole,
 7a. N—$C_1$–$C_4$alkyl-4-amino-5-cyanophthalimide,
 8a. 1-cyanomethyl-2-amino-4,5-dicyanimidazole.

4. A process according to claim 3, wherein D is a diazo component selected from the group consisting of:
 1b. aniline which is substituted by acetylamino, $C_3$–$C_8$alkoxycarbonyl, phenylsulfonyloxy, phenylazo or chloro,
 2b. nitroaniline which is additionally substituted by at least one member selected from the group consisting of chloro, bromo, cyano and nitro,
 3b. 2-amino-6-nitrobenzothiazole or 2-aminobenzothiazole, each substituted by two chlorine atoms, or 3-amino-5-nitrobenzisothiazole,
 4b. 5-amino-3-$C_1$–$C_2$alkoxycarbonyl-$C_2$–$C_4$alkylthio-1,2,4-thiadiazole,
 5b. 2-amino-3-nitro-5-$C_1$–$C_4$alkylcarbonylthiophene,
 6b. 2-amino-5-nitro-1,3-thiazole,
 7b. N—$C_1$–$C_2$alkyl-4-amino-5-cyanophthalimide.

5. A process according to claim 1, wherein K is a coupling component selected from the group consisting of:
 1. pyridine derivatives of formula

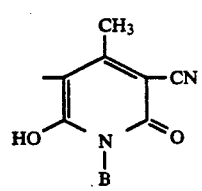

wherein B is $C_1$–$C_{16}$alkyl, unsubstituted or substituted by phenyl, phenoxy, hydroxy or $C_1$–$C_4$alkoxy, 2. aniline derivatives of formula

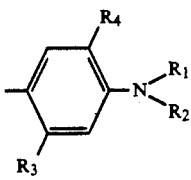
(18)

wherein

R₁ and R₂ are each independently of the other hydrogen or $C_1$–$C_6$alkyl which is unsubstituted or substituted by cyano, hydroxy, $C_1$–$C_4$alkylcarbonyloxy, phenylcarbonyloxy, cyano-$C_1$–$C_4$alkoxy, phenyl, phenoxy-$C_1$–$C_4$-alkoxy, succinimido or $C_1$–$C_4$alkoxycarbonyl, or wherein R₁ and R₂, together with the linking nitrogen atom, form a 5- or 6-membered ring, R₃ is hydrogen, chloro, $C_1$–$C_4$alkyl, $C_1$–$C_4$alkoxy, $C_1$–$C_4$alkylcarbonylamino, $C_1$–$C_4$alkylsulfonylamino, phenylcarbonylamino or cyano-$C_1$–$C_4$alkylcarbonylamino, and R₄ is hydrogen, chloro, bromo, $C_1$–$C_4$alkyl or $C_1$–$C_4$alkoxy;

3. pyrazole derivatives of formula

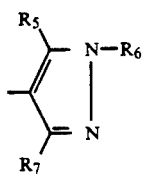
(19)

wherein

R₅ is hydroxy or imino,

R₆ is phenyl or a group of formula

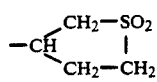
(20)

and

R₇ is $C_1$–$C_4$alkyl or $C_1$–$C_4$alkoxycarbonyl;

4. phenol or 1-naphthol, each unsubstituted or substituted by $C_1$–$C_4$alkyl or a group of formula

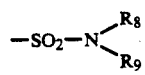
(21)

wherein R₈ is $C_1$–$C_4$alkyl and R₉ is hydroxy-$C_1$–$C_4$alkyl or $C_1$–$C_4$alkylcarbonyloxy-$C_1$–$C_4$alkyl;

5. pyrimidine derivatives of formula

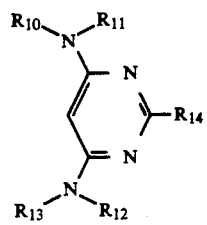
(22)

wherein R₁₀, R₁₁, R₁₂ and R₁₃ are each independently of one another hydrogen, $C_1$–$C_4$-alkyl, hydroxy-$C_1$–$C_4$-alkyl, cyano-$C_1$–$C_4$alkyl or $C_1$–$C_4$alkoxy-$C_1$–$C_4$alkyl, and R₁₄ is unsubstituted or substituted phenyl or naphthyl;

6. cyanoaminopyridines of formula

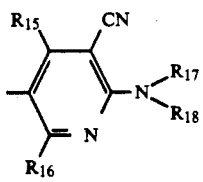
(23)

wherein

R₁₅ is amino or $C_1$–$C_4$alkyl,

R₁₆ is amino, NH—$C_1$–$C_4$alkyl or —NH—$C_1$–$C_4$-hydroxyalkyl, and

R₁₇ and R₁₈ are each independently of the other hydrogen or $C_1$–$C_8$alkyl which is unsubstituted or substituted by hydroxy, cyano, chloro, bromo, $C_1$–$C_8$alkoxy, phenoxy, phenyl or phenoxy-$C_1$–$C_4$alkoxy.

6. A process according to claim 5, wherein K is a coupling component selected from the group consisting of:

1a. Pyridine derivatives of formula (17), wherein B is branched $C_1$–$C_{12}$alkyl or $C_1$–$C_4$alkoxy-$C_2$–$C_4$alkyl;

2a. aniline derivatives of formula (18), wherein R₁ and R₂ are each independently of the other $C_1$–$C_4$alkyl which is unsubstituted to substituted by hydroxy, cyano, $C_1$–$C_4$alkylcarbonyloxy, phenylcarbonyloxy, phenyl, phenoxy-$C_1$–$C_4$alkoxy or $C_1$–$C_4$alkoxycarbonyloxy, R₃ is hydrogen, chloro, methyl or methoxy and R₄ is hydrogen or methoxy;

3a. pyrazole derivatives of formula (19), wherein R₅ is hydroxy, R₆ is phenyl and R₇ is $C_1$–$C_4$alkyl or $C_1$–$C_4$alkoxycarbonyl;

4a. phenol which is substituted by $C_1$–$C_4$alkyl or phenyl, or 1-naphthol which is substituted by a group of formula (21), wherein R₈ is $C_1$–$C_2$alkyl and R₉ is hydroxy-$C_1$–$C_4$alkyl or $C_1$–$C_2$alkylcarbonyloxy-$C_1$–$C_4$alkyl;

5a. pyrimidine derivatives of formula (22), wherein R₁₀ and R₁₂ are each hydrogen, R₁₁ and R₁₃ are each independently of the other $C_1$–$C_4$alkyl or hydroxy-$C_1$–$C_4$alkyl and R₁₄ is phenyl;

6a. cyanoamino pyridines of formula (23), wherein R₁₅ is amino or $C_1$–$C_2$alkyl, R₁₆ is amino or —NH—$C_1$–$C_2$hydroxyalkyl, R₁₇ is hydrogen and R₁₈ is $C_1$–$C_8$alkyl which is unsubstituted or substituted by $C_1$–$C_8$alkoxy, phenoxy or phenoxy-$C_1$–$C_4$alkoxy.

7. A process according to either claim 4 or claim 6, wherein D is a diazo component selected from the group consisting of:

1b. aniline which is substituted by acetylamino, $C_3$–$C_8$alkoxycarbonyl, phenylsulfonyloxy or phenylazo;

2b. nitroaniline which is additionally substituted by at least one member selected from the group consisting of chloro, bromo, cyano and nitro;

3b. 2-amino-6-nitrobenzothiazole or 2-aminobenzothiazole, which is substituted by two chlorine atoms, or 3-amino-5-nitrobenzisothiazole, and K is a coupling component selected from the group consisting of;

1a. pyridine derivatives of formula (17), wherein B is branched $C_1$-$C_{12}$alkyl or $C_1$-$C_4$alkoxy-$C_2$-$C_4$alkyl;

2a. aniline derivatives of formula (18), wherein $R_1$ and $R_2$ are each independently of the other $C_1$-$C_4$alkyl which is unsubstituted or substituted by hydroxy, cyano, $C_1$-$C_4$alkylcarbonyloxy, phenylcarbonyloxy, phenyl, phenoxy-$C_1$-$C_4$alkoxycarbonyloxy, $R_3$ is hydrogen, chloro, methyl or methoxy, and $R_4$ is hydrogen or methoxy.

8. A process according to claim 1, which comprises the use of an anthraquinone dye of formula (2), wherein $Z_1$ and $Z_2$ are each hydrogen, $R_{19}$ is hydrogen, $C_1$-$C_{12}$alkyl or phenyl-substituted $C_1$-$C_{12}$alkyl, phenyl or phenyl which is substituted by hydroxyalkyl or $C_1$-$C_4$alkylsulfonyloxy, $R_{20}$ is hydrogen, chloro, $C_1$-$C_2$alkoxy, $C_1$-$C_2$alkoxycarbonyl, $C_1$-$C_6$alkyltetraazolyl, phenoxysulfonyl, phenoxy or phenoxy which is substituted by $C_1$-$C_8$alkoxy, $C_1$-$C_8$alkylthio, $C_1$-$C_8$alkyl, cyano- $C_1$-$C_4$alkyl or a radical of formula

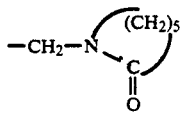

or is a radical of formula

—O—A—O—Y wherein A is $C_2$-$C_4$alkylene and Y is $C_1$-$C_4$alkoxycarbonyl, phenyl or phenoxycarbonyl, in which the phenyl moieties can be substituted by $C_1$-$C_4$alkoxy or $C_1$-$C_4$alkyl, $R_{21}$ is hydrogen, chloro, cyano or phenoxy which may be substituted by $C_1$-$C_4$alkyl or $C_1$-$C_4$alkoxy, and $R_{22}$ is hydroxy, amino or a —NHR$_{26}$ radical, wherein $R_{26}$ is $C_1$-$C_{12}$alkyl which may be substituted by phenyl.

9. A process according to claim 8, which comprises the use an anthraquinone dye of formula (2), wherein $R_{19}$ is hydrogen, branched $C_4$-$C_8$alkyl which may be substituted by phenyl, or phenyl which is substituted by hydroxy-$C_2$-$C_3$alkyl or $C_1$-$C_4$alkylsulfonyloxy $R_{20}$ is hydrogen, phenoxy which may be substituted by $C_1$-$C_4$alkyl or $C_1$-$C_4$alkoxy, or is a radical

—O—C$_2$H$_4$—O—Y wherein Y is phenyl, $C_1$-$C_4$alkylphenyl, $C_1$-$C_4$alkoxyphenyl, phenoxycarbonyl or $C_1$-$C_4$alkoxycarbonyl, $R_{21}$ is hydrogen, and $R_{22}$ is hydroxy, amino or $C_1$-$C_8$alkyl or phenyl-substituted $C_1$-$C_8$alkyl.

10. A process according to claim 1, which comprises the use of an anthraquinone dye of formula (3), wherein X is amino or nitro, $R_{23}$ is hydroxy, amino or $C_1$-$C_4$alkylamino, n is 0, 1 or 2, and $R_{24}$ is hydroxy, amino, $C_1$-$C_4$alkylamino, phenylamino or hydroxy-$C_2$-$C_4$alkylphenylamino.

11. A process according to claim 1, which comprises the use of an anthraquinone dye of formula (4), wherein A is a $C_2$-$C_4$alkylene radical, and $R_{25}$ is $C_1$-$C_4$alkyl, $C_1$-$C_4$alkoxy, $C_1$-$C_4$alkoxyethoxy, phenoxy, phenoxyethoxy or $C_1$-$C_4$alkoxycarbonylethoxy.

12. A process according to claim 1, which comprises the use of a dye of formula (5), wherein $R_{30}$ is cyano or a radical of formula (15), wherein $X_1$ is —NH, $R_{31}$ is hydrogen or cyano, $R_{32}$ is hydrogen, methyl or ethyl, $R_{33}$ is $C_1$-$C_4$alkyl, $R_{34}$ is $C_1$-$C_4$alkyl which may be substituted by cyano, phenyl, phenoxy, phenylthio, phenylcarbonyloxy, phenylaminocarbonyloxy or a radical of formula

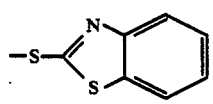

or wherein $R_{29}$ and $R_{33}$, together with the N atom and the two linking carbon atoms, form a tetrahydropyridine ring containing 0 to 4 methyl groups.

13. A process according to claim 1, which comprises the use of a dye of formula (6), wherein $R_{32}$ is hydrogen, methyl or ethyl, and $R_{35}$ $R_{36}$ are each $C_4$-$C_8$alkyl.

14. A process according to claim 1, which comprises the use of a dye of formula (7), wherein $R_{37}$ is hydrogen or allyl, $R_{38}$ is $C_1$-$C_4$alkyl, and $R_{39}$ is $C_1$-$C_4$alkyl or phenyl-$C_1$-$C_4$alkyl.

15. A process according to claim 1, which comprises the use of a dye of formula (8), wherein $R_{40}$ and $R_{41}$ are each methyl or ethyl, $R_{31}$ is hydrogen or cyano, and $Y_1$ is a radical of formula

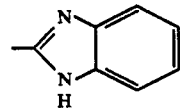

which may be substituted in the phenyl ring by $C_1$-$C_4$alkyl or chloro.

16. A process according to claim 1, which comprises the use of a dye of formula (9), wherein m is 1.

17. A process according to claim 1, which comprises use of a dye of formula (10), wherein $R_{42}$ is $C_1$-$C_4$alkoxy or $C_1$-$C_4$alkoxy-$C_2$-$C_4$alkoxycarbonyl-$C_2$-$C_4$alkoxy.

18. A process according to claim 1, which comprises the use of a dye of formula (11), wherein $R_{43}$ is hydrogen or phenylthio.

19. A process according to claim 1, which comprises the use of a dye of formula (12), (13) or (14).

20. A process according to claim 1, which comprises the use of a dye which contains no auxiliaries, preferably no diluent and dispersant.

21. A process according to claim 1, wherein dyeing is carried out in the temperature range from about 90° to about 200° C.

22. A process according to claim 1, wherein dyeing is carried out at a pressure from about 73 to about 400 bar.

23. A process according to claim 1, wherein the substrate is dyed at a liquor ratio of about 1:2 to about 1:100.

24. A process according to claim 1, wherein the supercritical $CO_2$ is purified after dyeing and reused for for dyeing further substrates.

25. A process according to claim 24, wherein the supercritical $CO_2$ is purified with a filter.

26. A process according to claim 24, wherein the supercritical $CO_2$ is purified by a temperature and/or pressure reduction and/or by an increase in volume.

27. The process according to claim 1, wherein the hydrophobic textile material is polyester textile material.

28. A process according to claim 21, wherein the dyeing is carried out in the temperature range from about 100° to about 150° C.

29. A process according to claim 22, wherein dyeing is carried out a pressure from about 150 to about 250 bar.

30. A process according to claim 23, wherein the substrate is dyed at a liquor ratio of about 1:5 to about 1:75.

31. Textile material dyed by a process as claimed in claim 1.

* * * * *